United States Patent [19]

Edmunds et al.

[11] Patent Number: 4,515,179
[45] Date of Patent: May 7, 1985

[54] PRESSURE RELIEF VALVE WITH ADJUSTMENT FOR SET PRESSURE

[75] Inventors: Robert H. Edmunds, Glenview; Jay D. Vanek, Brookfield, both of Ill.

[73] Assignee: Vapor Corporation, Chicago, Ill.

[21] Appl. No.: 461,752

[22] Filed: Jan. 28, 1983

[51] Int. Cl.³ ............................................. F16K 15/06
[52] U.S. Cl. .............................. 137/543.13; 137/536; 137/540; 251/285; 70/175
[58] Field of Search ................... 137/536, 540, 543.13, 137/385, 542; 251/285; 70/DIG. 53, 175, 176, 177, 178, 179, 180

[56] References Cited

U.S. PATENT DOCUMENTS

| | | | |
|---|---|---|---|
| 685,396 | 10/1901 | Dexter | 251/285 |
| 1,020,641 | 3/1912 | Dronsfield | 137/540 |
| 1,099,280 | 6/1914 | Connolly | 70/176 |
| 1,482,517 | 2/1924 | Kelsey | 137/540 |
| 2,364,812 | 12/1944 | Pierson | 137/542 |
| 2,755,817 | 7/1956 | Barr | 137/540 |
| 3,253,612 | 5/1966 | Curatola et al. | 251/285 |
| 3,272,218 | 9/1966 | Johnson | 137/540 |
| 3,601,362 | 8/1971 | Gunther | 251/285 |
| 3,796,228 | 3/1974 | Bedo et al. | 137/543.13 |

FOREIGN PATENT DOCUMENTS 2537206 3/1977 Fed. Rep. of Germany ...... 137/536

Primary Examiner—Alan Cohan
Assistant Examiner—John A. Rivell
Attorney, Agent, or Firm—Francis J. Lidd

[57] ABSTRACT

A pressure relief valve includes a housing defining an internal valve chamber. A valve seat is positioned within the chamber, and a valve pallet is reciprocally mounted within the chamber to engage the seat in a valve closed mode. A spring is mounted within the housing to bias the valve pallet into engagement with the valve seat. A spring retainer is threaded through an aperture in the housing and extends into the valve chamber. The spring is located within the retainer. A desired set pressure to be imposed upon the valve pallet is provided by threading the retainer relative to the housing thereby compressing the spring. To lock the retainer relative to the housing, an annular lock member is threaded onto the outside of the retainer. Once the desired set pressure is attained, the lock member is threaded on the retainer until it abuts the housing. The lock member includes first and second ends spaced apart to define a gap. A fastener is threaded into the first and second ends across the gap and may be tightened to narrow the gap and set the lock member onto the retainer. The retainer is then locked relative to the housing by a jamming screw threaded through the lock member into engagement with the housing. To provide better control of the spring an alternative retainer may be employed. The alternative retainer includes a pair of telescoping tubes with the spring positioned within the tubes. A first tube of the pair extends through and is threaded in a bushing mounted in an aperture in the valve housing. A second tube is connected by a gimbal mounting to the valve pallet. An alternative lock member may be secured to the retainer by a radial fastener.

16 Claims, 4 Drawing Figures

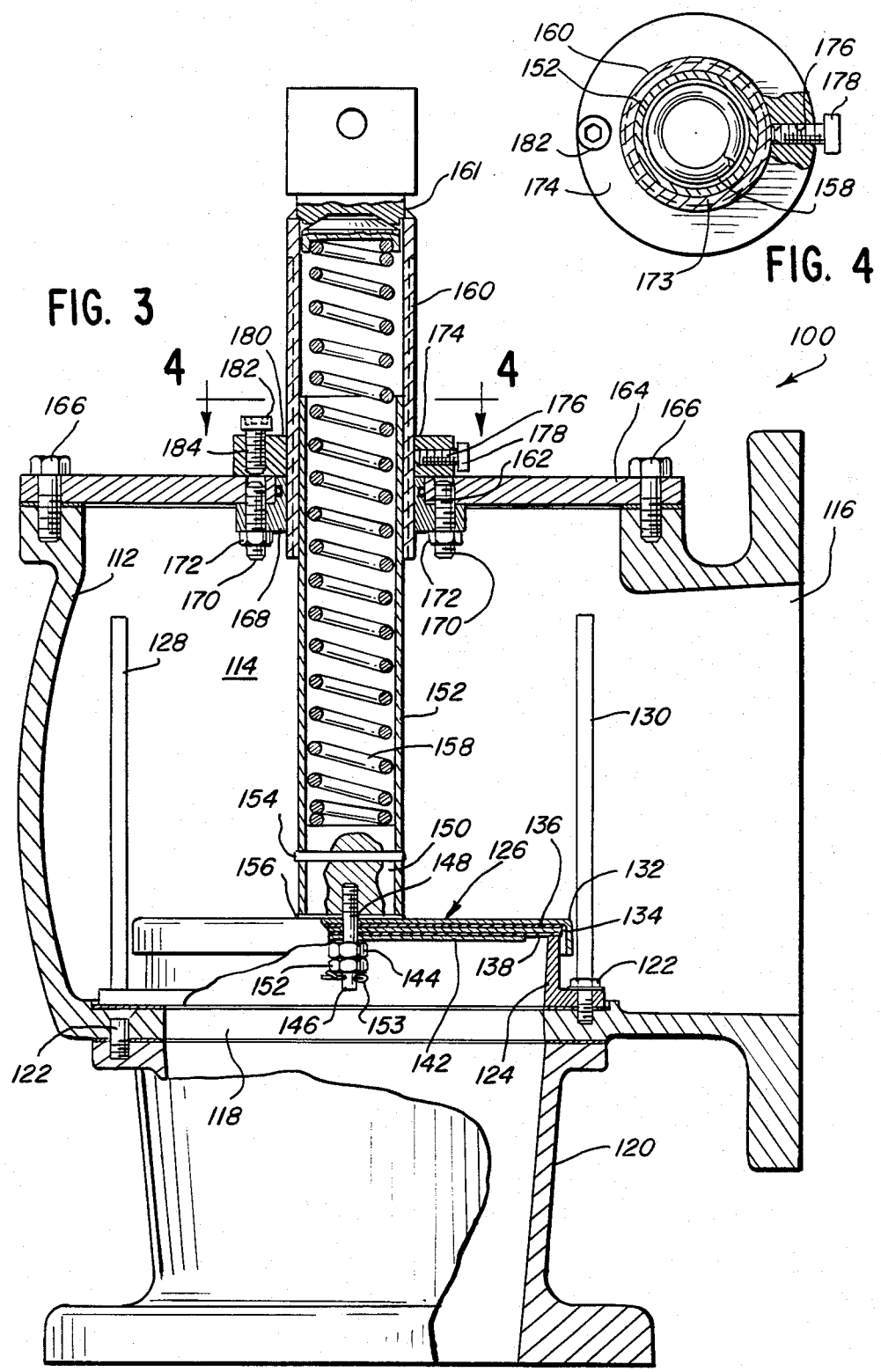

PRESSURE RELIEF VALVE WITH ADJUSTMENT FOR SET PRESSURE

BACKGROUND OF THE INVENTION

1. Field of the Invention

The present invention relates to a new and improved pressure relief valves with adjustable set pressure and to a new and improved method for adjusting the set pressure.

2. Description of the Background Art

To relieve product pressures at a predetermined value of relief thereby protecting the product container or vessel, pressure relief valves employing vertically guided horizontal valve pallets have been used. The valve pallet cooperates with a valve seat within a chamber in the valve housing. Since many of the products contained in the vessels are corrosive or contaminating in nature, it is a regular and necessary practice to examine the sealing surfaces of the valve pallet and associated valve seat. The construction of the typical valve, however, makes inspection of the valve pallet and seat a difficult and often hazardous task due to relatively large spring forces employed to apply a set pressure biasing the valve pallet into engagement with the valve seat. In order to inspect the typical pressure relief valve of this type, the product pressure must be removed from the vessel and the internal forces of the biasing member relieved by mechanical means that often require working within the valve housing. Once the inspection is completed and the valve reassembled, the set pressure of the spring must be recalibrated. During these inspections, serious injury to the inspector is always possible. Avoidance of these dangers during inspection and operation of the valve is desirable.

SUMMARY OF THE INVENTION

An object of the present invention is to provide a new and improved pressure relief valve.

Another object of the present invention is to provide a new and improved pressure relief valve the set pressure of which is adjustable.

A further object of the present invention is to provide a new and improved method for adjusting the set pressure of a pressure relief valve.

A still further object of the present invention is to provide a new and improved pressure relief valve that is easily disassembled, inspected, reassembled and calibrated.

Briefly, the present invention is directed to a new and improved pressure relief valve and to a new and improved method for adjusting the set pressure of the valve. The pressure relief valve includes a housing defining an internal chamber. A valve seat is mounted within the internal chamber and a valve pallet is reciprocally mounted in the chamber in a position to engage the valve seat in a valve closed mode. A resilient spring or biasing member is mounted within the housing to impress a biasing force on the valve pallet. The spring is mounted within a retainer that threadably extends through an aperture in the housing. The pressure developed by the spring is adjusted by varying the position of the retainer within the aperture. Once the desired set pressure is obtained, the position of the retainer is locked relative to the housing by an annular lock member. The lock member encircles and is threaded on the retainer. The annular member includes two spaced ends defining a gap and a threaded fastener is threaded into the two ends to span the gap. By threading the fastener, the gap may be narrowed or enlarged thereby locking or releasing the lock member relative to the retainer. The lock member is threaded onto the retainer until it abuts the housing and the threaded fastener is then threaded to narrow the gap and set the lock member onto the retainer. The retainer may then be locked on the housing by a jamming screw that is threaded through the lock member into engagement with the housing. To inspect the valve pallet and valve seat, the jamming screw is loosened and the spring retainer is rotated relative to the valve housing to allow the spring to extend. The biasing force of the spring is thereby removed from the valve pallet and the valve may be disassembled. After the valve pallet and seat are inspected, the valve may be reassembled and the spring retainer threaded into the aperture until the lock member engages the housing. Following this procedure, the retainer is positioned at the previously calibrated position thereby obviating the need for recalibration.

To provide improved control of the resilient spring or biasing member, an alternative retainer may be employed in the above described pressure relief valve. The alternative retainer includes first and second telescoping tubes. The first tube or adjuster is threaded through a bushing mounted in the above described aperture in the housing. The second tube is coupled to the valve pallet by a gimbal coupling that allows some movement of the pallet upon engagement with the valve seat to ensure complete sealing. The resilient spring is positioned within the first and second telescoping tubes to impress a biasing force on the pallet. The magnitude of the set pressure or biasing force is varied by threading the first tube or adjuster in the bushing. Once the desired set pressure is attained, the adjuster is locked relative to the housing by an annular lock member that is threaded on the retainer into engagement with the housing. A first set screw is threaded radially through the lock member into engagement with the adjuster setting the lock member relative to the adjuster. A second jamming screw is threaded axially through the lock member into engagement with the housing locking the adjuster relative to the housing. Inspection of the pallet and valve seat is accomplished by removing the set pressure on the pallet, loosening the second jamming screw and threading the adjuster upward from the housing. The valve may then be disassembled and the pallet seat inspected. Once the inspection is completed, the adjuster is threaded into the aperture until the locking member engages the housing. The second jamming screw is then threaded into engagement with the housing resulting in the same set pressure as prior to the inspection.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 3 is a vertical, partially cut-away view of a valve with an alternative spring retainer, and;

FIG. 4 is a view taken generally along line 4—4 of FIG. 3.

DETAILED DESCRIPTION OF PREFERRED EMBODIMENTS

Figure 2:
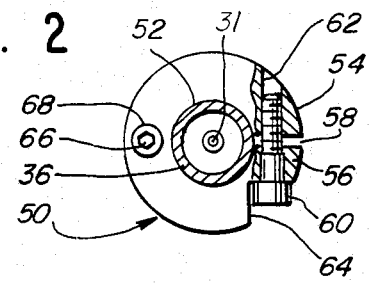
FIG. 2 is a view taken generally along line 2—2 of FIG. 1.
Figure 1:
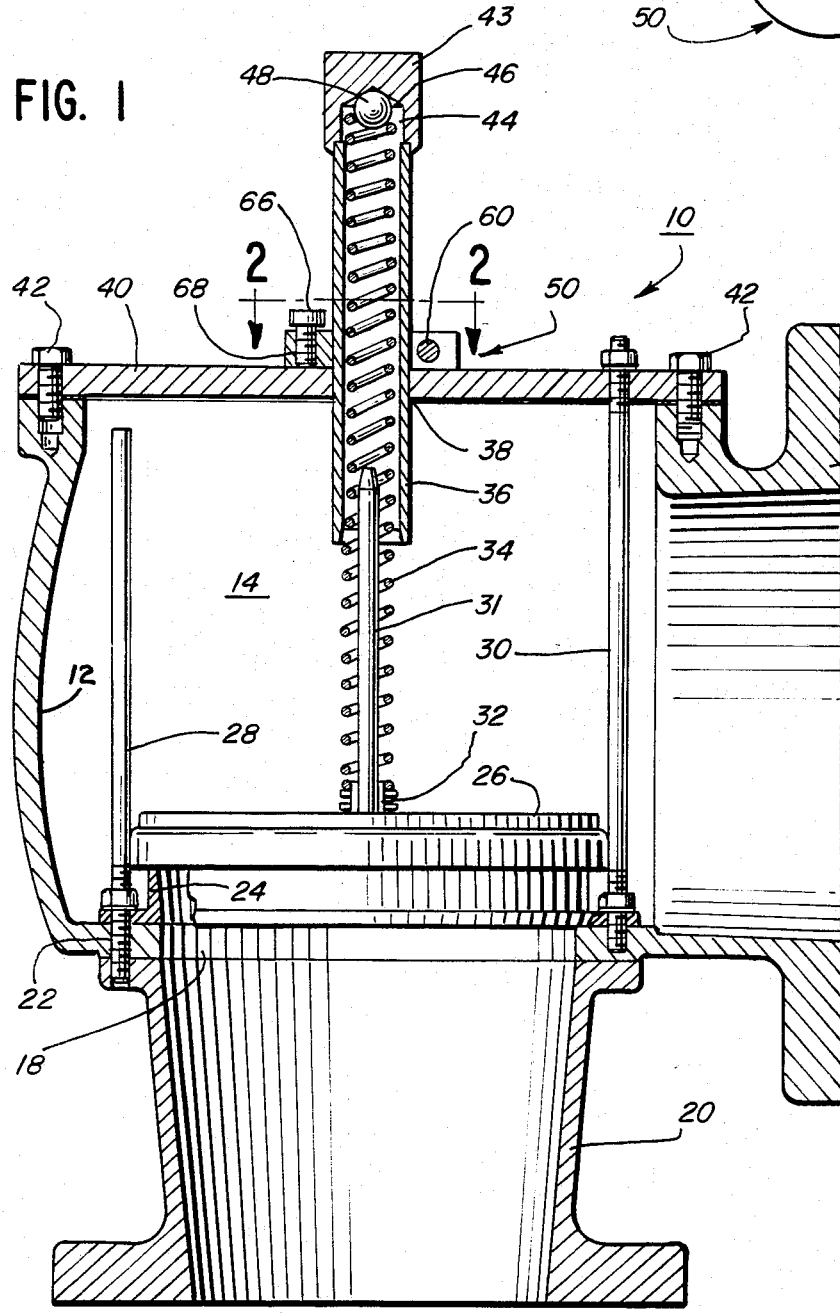
FIG. 1 is a vertical cross sectional view of a valve constructed in accordance with the principles of the present invention.

In the drawing there is illustrated a large flow pressure relief valve generally designated by the reference numeral 10. The pressure relief valve 10 includes a valve housing or body 12 defining an internal valve chamber 14. The housing 12 includes a first discharge port 16 and a main discharge port 18. The valve body 12 is affixed at the port 18 to a base 20 by a plurality of fasteners 22. The fasteners 22 also secure a valve seat 24 to the main discharge port 18. A valve closure member or pallet 26 is positioned within the chamber 14 and aligned by valve guides 28 and 30 to reciprocate in chamber 14 and engage the seat 24 in the valve closed position. A valve stem or guide 31 is rigidly mounted in a socket or cup 32 defined on the upper surface of the valve pallet 26.

A valve calibration or lift spring 34 is concentrically mounted on the valve stem 31 and extends upwardly into a spring retainer 36. The retainer 36 is threaded along its entire length and extends through a threaded aperture 38 fabricated in a valve cover 40 secured to the valve body 12 by threaded fasteners 42. The threaded retainer 36 is terminated at its upper end by a cap 43 that includes an aperture 44 into which the spring 34 extends. The upper end of aperture 44 includes conical surface 46 and a spherical spring guide 48 is positioned therein and within the inside diameter of spring 34. The conical surface 46 functions to center the spherical spring guide 48 thus aligning the spring 34 within the retainer 36. By threading the retainer 36 within the aperture 38, the spring 34 is compressed or extended thereby varying the pressure exerted on the pallet 26.

Once a desired set pressure has been established by threading the retainer 36 in the aperture 38, the retainer 36 is locked relative to the cover 40 by an annular lock member or adjusting stop 50. The member 50 includes a central threaded aperture 52 through which the retainer 36 is threaded. The stop member 50 also includes first 54 and second 56 ends spaced apart by a gap 58. The gap 58 is spanned by a threaded fastener 60 that is threaded into an aperture 62 extending through both ends 54 and 56. A notch 64 is fabricated in the stop member 50 to allow access to the head of the fastener 60. By threading the fastener 60 into the aperture 62, the gap 58 is narrowed and inter-thread friction between the stop member 50 and the retainer 36 is increased to the extent that the stop member 50 cannot be turned relative to the retainer 36.

To adjust the set pressure, the threaded fastener 60 is threaded partially out of the aperture 62 widening the gap 58 and allowing stop member 50 to be easily threaded upwardly on the retainer 36. The retainer 36 is then threaded into the aperture 38 until the desired set pressure on the pallet 26 is established. Stop member 50 is then threaded downwardly on the retainer 36 until the bottom of the stop member 50 engages the cover 40. The fastener 60 is then threaded into the aperture 62 to lock the stop member 50 onto the retainer 36 and prevent the retainer 36 from being rotated into the aperture 38.

To prevent rotation of the stop member 50 relative to the cover 40 and thereby prevent rotation of the retainer 36 upward, a set screw 66 is threaded into a threaded aperture 68 axially extending through the stop member 50 until screw 66 engages the cover 40. This engagement restricts the tendency of the lock member 50 to turn on its threaded engagement with the retainer 36 thereby avoiding any movement of the retainer 36 due to vibration.

During operation of the valve 10 it is periodically necessary to inspect the valve pallet 26 and the valve seat 24 for deterioration and wear. An inspection of valve 20 is easily accomplished without the necessity of recalibrating the set pressure. Prior to inspection, the set screw 66 is threaded out of engagement with the cover 40. The retainer 36 may then be threaded upward removing the set pressure of the spring 31 from the pallet 26. There are no internal forces of the spring 34 to be further removed in order to avoid harm to the inspector and the cover 40 may be removed from the valve body 12 by removal of the fasteners 42. Access is then available to the chamber 14 whereupon the pallet 26 and valve seat 24 may be inspected and replaced if necessary. Once the inspection has been completed, the cover 40 is repositioned on the valve body 12 and the fasteners 42 threaded into the body 12. The retainer 36 is then threaded into the aperture 38 until the locking member 50 abuts the cover 40. The set screw 66 may then be threaded into engagement with the cover 40. After this inspection, the position of the retainer is the same as that prior to the inspection and recalibration of the set pressure is not necessary.

Since control of spring 34 below retainer 36 is maintained only by the stem 31, under some conditions upward movement of the pallet 26 may result in tilting of the stem 31 and misalignment of the pallet 26 with the valve seat 24 upon reseating of the pallet 26. To attain better control of the retainer spring 34 an alternative retainer illustrated in FIGS. 3 and 4 may be employed. The alternative retainer may be employed in the valve generally designated by the reference numeral 100 illustrated in FIG. 3. Valve 100 includes a valve body 112 defining an internal valve chamber 114. A first discharge port 116 is defind in the valve body 112 as is a main discharge port 118. The valve body 112 is affixed at the main discharge port 118 to a base 120 by a plurality of fasteners 122. The fasteners 122 also secure a valve seat 124 to the valve body 112.

A valve closure member or pallet generally designated by reference numeral 126 is aligned by valve guides 128 and 130 to reciprocate in the chamber 114 and engage the seat 124 in the valve closed position. The valve pallet 126 includes a pallet cover or housing 132 within which is positioned a reinforcing disc 134 positioned between first and second back up discs 136 and 138. A retaining plate 142 is positioned against the disc 138. The pallet 126, pallet cover 132, discs 134, 136 and 138 and plate 142 are secured by a pair of nuts 144 and 152 and a stem 146 that extends through a central aperture 148 defined in the pallet 126 and is secured in a plug 150 by a pin 154. The nuts 144 and 152 are locked onto the stem 146 by a cotter pin 153.

Pin 154 also mounts plug 150 in an open end of a stem guide 152 that allows some pivotal movement of plug 150 about an axis extending along the pin 154. Nuts 144 and 152 are positioned relative to pallet 126 to provide a slight clearance between the lower end of the tube 152 and the pallet 126. A resilient gasket 156 is positioned in this gap to allow some movement of the pallet 126 relative to the lower end of the tube 152. The connection of the pallet 126 to the tube 152 is a gimbal type connection allowing some movement of the pallet 126 upon engagement with the valve seat 124 ensuring proper sealing between these two members. This gimbal connection is beneficial since in the valve 100 a spring 158 is mounted within the tube 152 and extends into a second tube or adjuster 160 with the upper end of spring 158 being retained in a semiconical spring retainer 161 which allows only limited freedom of movement of the spring 158. Without the gimbal connection the pallet 126 would be rigidly secured to the retainer tube 152 preventing correction of position if the valve pallet 126 were misaligned with the seat 124.

A cover 164 is secured to the upper end of the valve body 112 by fasteners 166 and includes an aperture 162 into which an annular bushing 168 is mounted. Bushing 168 is secured to the cover 164 by threaded pins 170 and nuts 172. The bushing 168 includes a threaded aperture 173 into which the adjuster 160 that includes threads on the outer surface is threaded.

The set pressure of valve 100 may be adjusted by threading the adjuster 160 in the bushing 168 to compress or elongate spring 158. Once the desired set pressure has been attained, the position of the adjuster 160 relative to the valve body 112 is locked by an annular locking element 174. The annular locking element 174 includes a radially threaded aperture 176 into which a set screw 178 is threaded. The annular lock member 174 further includes a central threaded aperture 180 allowing the lock member 174 to be threaded onto the adjuster 160 to a position engaging the cover 164. Once the desired set pressure is established, the set screw 178 is threaded into the aperture 176 to engage the adjuster 160 locking member 174 relative to the adjuster 160. The lock member 174 may then be locked relative to the cover 164 by a second set screw 182 that is threaded into an axial aperture 184. The set screw 182 operates similar to the set screw 66 of the valve 10 in that it is threaded into engagement with the cover 164 locking the lock member 174 and hence the adjuster 160 relative to the cover 164.

To inspect the valve pallet 126 and the valve seat 124, set screw 182 is threaded out of the aperture 184 allowing the lock member 174 and the adjuster 160 to be threaded upwardly from cover 164 elongating spring 158 and reducing the set pressure. Once the set pressure has been reduced, the cover 164 may be removed allowing access to the chamber 114. After inspection and replacement, if necessary, has been completed; cover 164 may be repositioned on the valve body 112 by the fasteners 166. The set pressure may then be reapplied to valve pallet 126 by threading adjuster 160 into bushing 158 until the lock member 174 engages cover 164. The lock member 174 may then be locked relative to the cover 164 by threading set screw 182 into engagement with cover 164. As in the valve 10, this procedure allows reassembly of the valve 100 without recalibration of the set pressure.

What is claimed and sought to be secured by Letters Patent of the United States is:

1. A pressure relief valve, comprising:
   a housing defining a valve chamber,
   a valve seat in said chamber,
   a valve pallet,
   means for reciprocally mounting said valve pallet in said chamber and aligning said valve pallet to engage said valve seat in a valve closed position,
   means for biasing said valve pallet into engagement with said valve seat,
   means for retaining said biasing means, said retaining means movable into and out of said chamber,
   a stop member releasably secured on said retaining means, said stop member including a locking element locking said stop member to said retaining means, and means for releasably securing said stop member to said housing, said releasably securing means extending through said stop member and movable relative to said stop member into and out of engagement with said housing.

2. The pressure relief valve set forth in claim 1 wherein said stop member is annular and encircles said retaining means, said stop member includes first and second ends spaced a predetermined distance apart to define a gap.

3. The pressure relief valve set forth in claim 2 further comprising means for closing said gap.

4. The pressure relief valve set forth in claim 1 wherein said retaining means is threaded into said housing to extend into said chamber.

5. The pressure relief valve set forth in claim 1 wherein said stop member is threaded on said retaining means.

6. The pressure relief valve set forth in claim 1 wherein said stop member is annularly encircling said retainer and including a set screw threaded in a radial aperture in said stop member to engage said retainer.

7. The pressure relief valve set forth in claim 1 wherein said retaining means comprises a first tube threadably mounted in said housing and a second tube telescoped in said first tube, said valve pallet coupled to said second tube by a gimbal connection.

8. A method for adjusting the set pressure of a pressure relief valve wherein said valve includes a valve body defining an internal chamber, a valve seat in said chamber, a valve reciprocally mounted in said chamber engaging said seat in a valve closed position, resilient means for biasing said valve into said seat, a retainer for said resilient means movably mounted in said housing, a stop member removably secured to said retainer and a securing element for securing said stop member to said housing, said adjusting method comprising the steps of:
   moving said retainer relative to said housing to compress said resilient means,
   moving said stop member to abutting engagement with said body,
   securing said stop member to said retainer to lock said retainer relative to said body, and
   actuating said securing element to secure said stop member to said housing, wherein said securing element comprises a fastener threaded through said stop member, said actuating step comprises threading said fastener into engagement with said housing.

9. The adjusting method claimed in claim 8 wherein said retainer is threaded in said housing and said moving step comprises threading said retainer into or out of said housing.

10. The adjusting method claimed in claim 8 wherein said stop member is annular with first and second ends spaced from each other to define a gap, a threaded fastener is threaded into said stop member across said gap, said stop member encircles said retainer, said stop of securing said stop member to said retainer comprises threading said threaded fastener to narrow said gap.

11. The adjusting method claimed in claim 8 wherein said stop member is annular, a threaded fastener is threaded radially through said stop member, said step of securing said stop member to said retainer comprises threading said threaded fastener into engagement with said retainer.

12. An adjustable pressure relief valve, comprising:
a housing;
a valve chamber in said housing,
a valve seat in said valve chamber,
a valve pallet reciprocally mounted in said valve chamber to engage said valve seat in a valve closed mode,
a resilient member in said chamber engaging said valve pallet to bias said valve pallet into engagement with said valve seat,
a retainer for said resilient member, means for varying the positions of said retainer relative to said housing, and
a locking member encircling said retainer adjustably locking the vertical and rotational positions of said retainer relative to said housing, said locking member includes a threaded screw threadable through said locking member into said housing.

13. The adjustable pressure relief valve set forth in claim 12 wherein said retainer is threadably mounted in said housing.

14. The adjustable pressure relief valve set forth in claim 12 wherein said locking member is annular with first and second ends spaced from each other to define a gap, said locking member including a threaded fastener extending across said gap.

15. The adjustable pressure relief valve set forth in claim 12 wherein said retainer includes a first tube threadably mounted in said housing and a second tube telescopically mounted in said first tube, said valve pallet coupled to said second tube.

16. The adjustable pressure relief valve set forth in claim 12 wherein said valve pallet is coupled to said retainer by a gimbal coupling.

* * * * *